(12) United States Patent
Suikkanen et al.

(10) Patent No.: US 9,973,252 B2
(45) Date of Patent: May 15, 2018

(54) TRANSMISSION ADAPTATION

(71) Applicant: Nokia Solutions and Networks Oy, Espoo (FI)

(72) Inventors: Essi Suikkanen, Oulu (FI); Johanna Ketonen, Oulu (FI); Markku Juntti, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 15/356,760

(22) Filed: Nov. 21, 2016

(65) Prior Publication Data
US 2017/0070278 A1 Mar. 9, 2017

Related U.S. Application Data

(62) Division of application No. 14/413,763, filed as application No. PCT/EP2012/066573 on Aug. 27, 2012, now Pat. No. 9,537,640.

(51) Int. Cl.
*H04B 7/06* (2006.01)
*H04L 27/18* (2006.01)
*H04L 1/00* (2006.01)
*H04L 5/00* (2006.01)
*H04L 27/34* (2006.01)
*H04B 7/0413* (2017.01)
*H04W 84/04* (2009.01)

(52) U.S. Cl.
CPC ......... *H04B 7/0632* (2013.01); *H04L 1/0003* (2013.01); *H04L 1/0009* (2013.01); *H04L 1/0025* (2013.01); *H04L 5/0007* (2013.01); *H04L 5/0057* (2013.01); *H04L 27/18* (2013.01); *H04L 27/34* (2013.01); *H04B 7/0413* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 5,828,672 A | 10/1998 | Labonte | 370/252 |
| 6,701,129 B1 | 3/2004 | Hashem | 370/468 |
| 7,894,390 B2 | 2/2011 | Nakamata | 370/329 |
| 8,503,322 B2 | 8/2013 | Krishnamurthy | 370/252 |

(Continued)

FOREIGN PATENT DOCUMENTS

| | | |
|---|---|---|
| EP | 2066058 A2 | 6/2009 |
| WO | WO-2008/053323 A2 | 5/2008 |

*Primary Examiner* — Eunsook Choi
(74) *Attorney, Agent, or Firm* — Harrington & Smith

(57) ABSTRACT

The invention relates to an apparatus including: at least one processor and at least one memory including a computer program code, the at least one memory and the computer program code configured to, with the at least one processor, cause the apparatus at least to: choose a modulation, coding and rank scheme; determine a channel quality indicator based on the modulation, coding and rank scheme, and add a detector class indicator to the channel quality indicator for informing capability to a high order modulation if the high order modulation is chosen. In one particular embodiment the high order modulation is 64-QAM and excludes QPSK and 16-QAM, and the added detector class indictor can be a single bit.

13 Claims, 3 Drawing Sheets

(56) References Cited

U.S. PATENT DOCUMENTS

Figure 1:
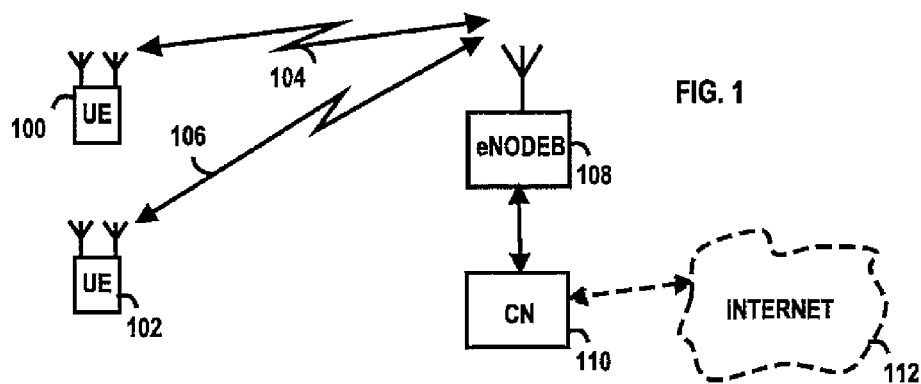

| | | | |
|---|---|---|---|
| 8,995,362 B2* | 3/2015 | Kim | H04L 1/1812 370/329 |
| 2001/0055319 A1 | 12/2001 | Quigley | 370/480 |
| 2005/0002467 A1 | 1/2005 | Seo | 375/267 |
| 2007/0217388 A1 | 9/2007 | Shiizaki | 370/349 |
| 2009/0196260 A1 | 8/2009 | Stewart | 370/335 |
| 2009/0232101 A1* | 9/2009 | Papasakellariou | H04L 1/0026 370/335 |
| 2010/0023830 A1* | 1/2010 | Wengerter | H04L 1/0025 714/748 |
| 2010/0220663 A1* | 9/2010 | Sawahashi | H04L 1/0003 370/329 |
| 2010/0254315 A1* | 10/2010 | Zhao | H04L 5/1453 370/328 |
| 2011/0299484 A1 | 12/2011 | Nam et al. | 370/329 |
| 2012/0155447 A1 | 6/2012 | Vermani et al. | 370/338 |
| 2013/0182646 A1 | 7/2013 | Shiizaki | 370/328 |
| 2013/0215831 A1* | 8/2013 | Pang | H04L 1/0004 370/328 |
| 2013/0252660 A1* | 9/2013 | Bach | H04W 52/0206 455/525 |
| 2015/0181567 A1* | 6/2015 | Skov | H04W 24/10 370/329 |
| 2015/0201326 A1* | 7/2015 | Kazmi | H04W 28/18 370/329 |

* cited by examiner

TRANSMISSION ADAPTATION

CROSS REFERENCE TO RELATED APPLICATION

This application is a divisional application of U.S. patent application Ser. No. 14/413,763 (filed on Jan. 9, 2015; now allowed) which is a U.S. national stage entry of International Patent Application PCT/EP2012/066573 (filed Aug. 27, 2012). The entire contents of these two priority applications are hereby incorporated by reference.

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The long term evolution (LTE) standard is designed to use a combination of multiple-input multiple-output (MIMO) and orthogonal frequency division multiplexing (OFDM) to offer better performance in terms of capacity, diversity and bandwidth efficiency. LTE subcarriers are usually received with different quality levels due to frequency selective fading, which causes the subcarriers to vary over time, frequency and/or spatial dimensions. This behavior may be exploited by using link adaptation. The link adaptation usually refers to techniques of selecting the best modulation, coding and rank scheme (MCRS) as well as a precoding matrix for a current channel state for optimizing performance under a certain constraint such as a frame error rate (FER).

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: choose a modulation, coding and rank scheme, determine a channel quality indicator based on the modulation, coding and rank scheme, and add a detector class indicator to the channel quality indicator for informing capability to the high order modulation, if a high order modulation is chosen.

According to an aspect of the present invention, there is provided an apparatus comprising: at least one processor and at least one memory including a computer program code, the at least one memory and the computer program code configured to, with the at least one processor, cause the apparatus at least to: obtain a channel quality indicator comprising a detector class indicator informing transmitter's capability to a high order modulation, and substitute the modulation, coding and rank scheme utilizing the high order modulation with a modulation, coding and rank scheme utilizing a lower order modulation and providing nearest similar performance, if the high order modulation is not supported by a receiver.

According to yet another aspect of the present invention, there is provided a method comprising: choosing a modulation, coding and rank scheme, determining a channel quality indicator based on the modulation, coding and rank scheme, and if a high order modulation is chosen, adding a detector class indicator to the channel quality indicator for informing capability to the high order modulation.

According to yet another aspect of the present invention, there is provided a method comprising: obtaining a channel quality indicator comprising a detector class indicator informing transmitter's capability to a high order modulation, and if the high order modulation is not supported by a receiver, substituting the modulation, coding and, rank scheme utilizing the high order modulation with a modulation, coding and rank scheme utilizing a lower order modulation and providing nearest similar performance.

According to yet another aspect of the present invention, there is provided an apparatus comprising: means for choosing a modulation, coding and rank scheme, means for determining a channel quality indicator based on the modulation, coding and rank scheme, and means for adding a detector class indicator to the channel quality indicator for informing capability to the high order modulation, if a high order modulation is chosen.

According to yet another aspect of the present invention, there is provided an apparatus comprising: means for obtaining a channel quality indicator comprising a detector class indicator informing transmitter's capability to a high order modulation, and means for substituting the modulation, coding and rank scheme utilizing the high order modulation with a modulation, coding and rank scheme utilizing a lower order modulation and providing nearest similar performance, if the high order modulation is not supported by a receiver.

According to yet another aspect of the present invention, there is provided a computer program embodied on a computer-readable storage medium, the computer program comprising program code for controlling a process to execute a process, the process comprising: choosing a modulation, coding and rank scheme, determining a channel quality indicator based on the modulation, coding and rank scheme, and if a high order modulation is chosen, adding a detector class indicator to the channel quality indicator for informing capability to the high order modulation.

According to yet another aspect of the present invention, there is provided a computer program embodied on a computer-readable storage medium, the computer program comprising program code for controlling a process to execute a process, the process comprising: obtaining a channel quality indicator comprising a detector class indicator informing transmitter's capability to a high order modulation, and if the high order modulation is not supported by a receiver, substituting the modulation, coding and rank scheme utilizing the high order modulation with a modulation, coding and rank scheme utilizing a lower order modulation and providing nearest similar performance.

LIST OF DRAWINGS

Figure 2:
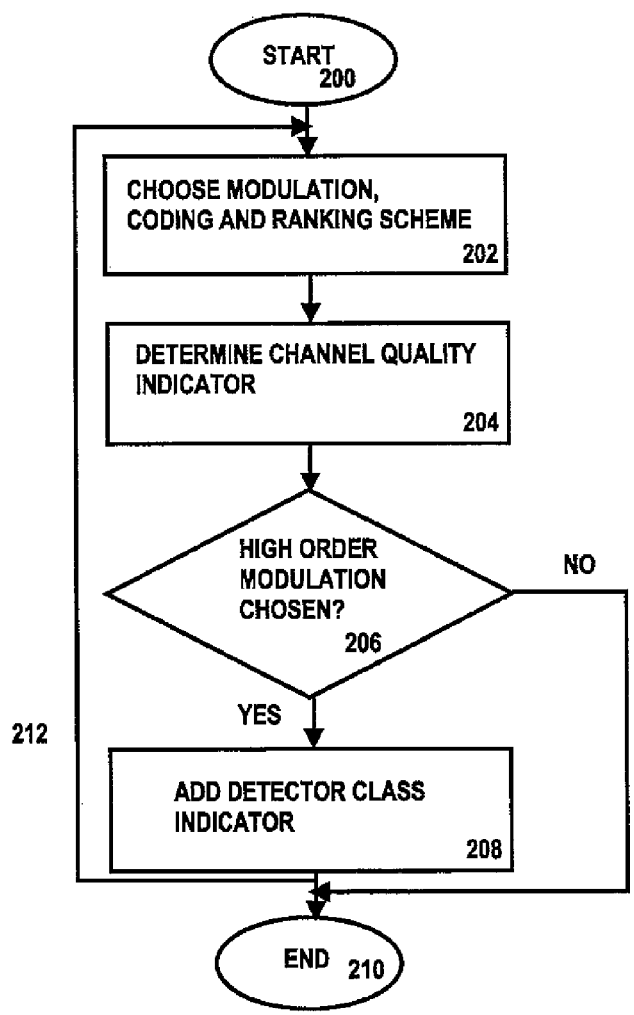
Figure 3:
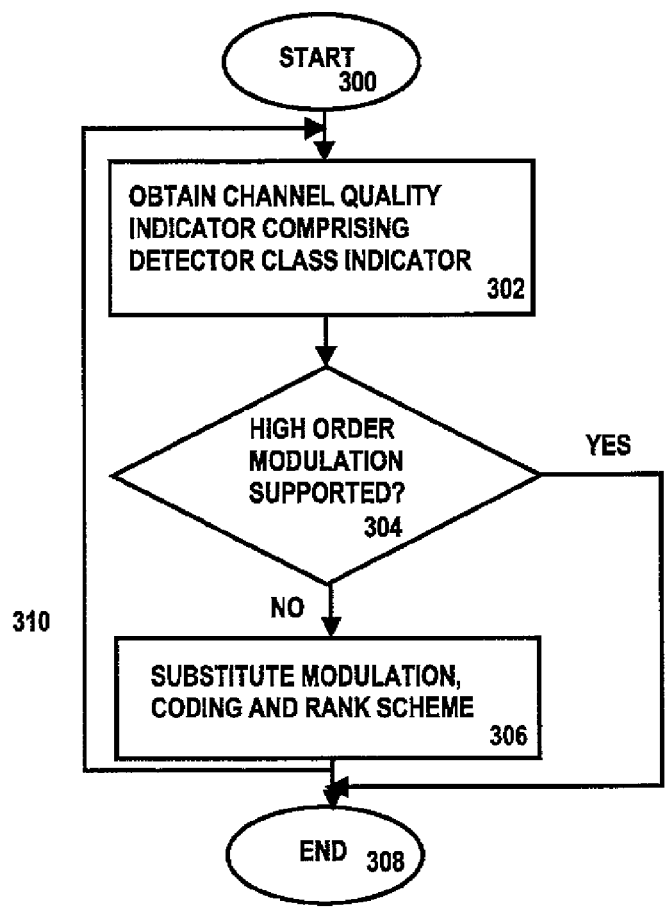
Figure 4:
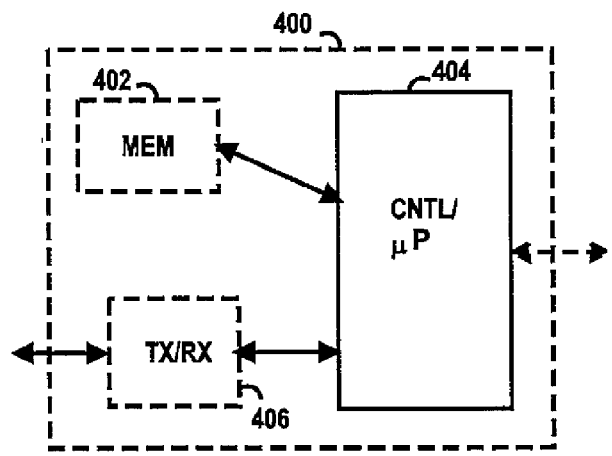
Figure 5:
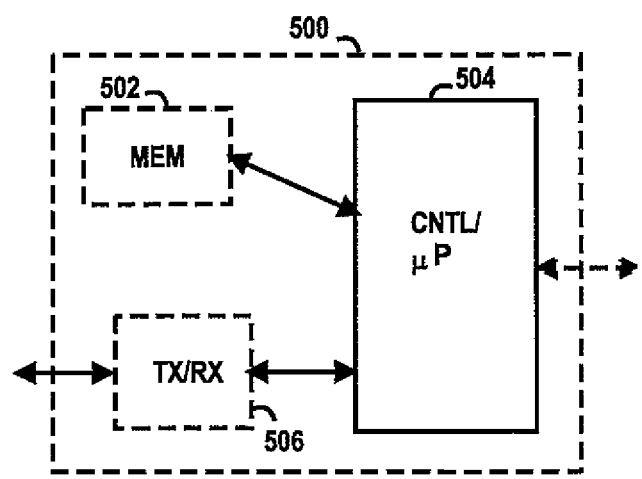

Some embodiments of the present invention are described below, by way of example only, with reference to the accompanying drawings, in which FIG. 1 illustrates an example of a system;

FIG. 2 is a flow chart;

FIG. 3 is another flow chart;
FIG. 4 illustrates examples of apparatuses;
FIG. 5 illustrates other examples of apparatuses.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced-(LTE-A) or LTE/EPC (EPC=evolved packet core, EPC is enhancement of packet switched technology to cope with faster data rates and growth of Internet protocol traffic). E-UTRA is an air interface of LTE Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 1 10 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes. The communication system is also able to communicate with other networks, such as a public switched telephone network or the Internet 1 12. The communication network may also be able to support the usage of cloud services. It should be appreciated that (e)NodeBs or their functionalities may be implemented by using any node, host, server or access point etc. entity suitable for such a usage.

The user device (also called LTE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practice, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e)NodeBs are required to provide such a network structure.

Recently for fulfilling the need for improving the deployment and performance of communication systems, the concept of "plug-and-play" (e)NodeBs has been introduced. Typically, a network which is able to use "plug-and-play" (e)NodeBs, includes, in addition to Home (e)NodeBs (H(e)NodeBs), a home node B gateway, or HNB-GW (not shown in FIG. 1). A HNB Gateway (HNB-GW), which is typically installed within an operator's network may aggregate traffic from a large number of HNBs back to a core network.

The long term evolution (LTE) standard is designed to use a combination of multiple-input multiple-output (MIMO) and orthogonal frequency division multiplexing (OFDM) to offer better performance in terms of capacity, diversity and bandwidth efficiency. LTE subcarriers are usually received with different quality levels due to frequency selective fading, which causes the subcarriers to vary over time, frequency and/or spatial dimensions. This behavior may be exploited by using link adaptation. The link adaptation is a term typically used in wireless communications to denote matching of the modulation, coding and/or other signal and protocol parameters to the conditions on a radio link. This may refer to techniques of selecting the best modulation, coding and rank scheme (MCRS) as well as a precoding matrix for a current channel state for optimizing performance under a certain constraint such as frame error rate (FER). Adaptive modulation systems are designed to improve transmission rate, and/or bit error rates. Adaptive modulation systems may provide performance enhancements especially in fading channels.

Link adaptation usually requires feedback from a receiver to a transmitter. For this purpose, the receiver may determine a channel quality indicator (CQI) and send it to the transmitter. The CQI typically comprises a recommended modulation order and coding rate. A recommended transmission rank may be indicated with a rank indicator (RI). Additionally, a precoding matrix may also be adaptively selected. For precoding a receiver may determine a precoding matrix indicator (PMI) which comprises the most suitable precoding matrix index for a current channel state. The selection of the suitable modulation order, coding rate and rank is usually based on a link quality metric (LQM). The LQM may be determined by using signal-to-interference-plus-noise ratio (SINR), mutual information and/or capacity. The most suitable modulation and coding scheme (MCS) and rank may then be chosen by using a look-up-table (LUT). The chosen MCS and rank may be sent back to the transmitter in the form of a CQI and/or RI.

In the LTE, currently, three different modulation orders are provided: quadrature phase shift keying (QPSK), 16-quadrature amplitude modulation (16-QAM) and 64-quadrature amplitude modulation (64-QAM). In general, by using a higher order modulation, more information bits per each modulation symbol may be conveyed. Thus, the use of higher order modulation usually provides higher data rates, but at the same time the robustness to noise and interference are reduced. Usually, a high modulation order increases receiver complexity and latency as well as power consumption compared to a lower one.

One embodiment may be carried out by a device configured to operate as a user device or terminal.

The embodiment is suitable for user devices that do not support 64-quadrature amplitude modulation (64-QAM) or another high order modulation, but have a detector able to process higher code rates and number of transmission streams to reach a higher data rate.

The embodiment starts in block 200 of FIG. 2.

In block 202, a modulation, coding and rank scheme is chosen.

The selection of the suitable modulation order, coding rate and rank is usually based on determining a link quality metric which may in turn be based on signal-to-interference-plus-noise ratio (SINR), mutual information, capacity and/or radio channel conditions.

A link quality metric (LQM) is designed to give information about channel conditions. Several methods for mapping different radio channel parameters to a LQM value exists, such as determining an instantaneous signal-to-noise ratio (SNR), minimum and average subcarrier capacities, channel capacity as well as approaches using an effective SINR mapping (ESM) concept. Effective SINR mapping concepts, especially exponential effective SINR mapping (EESM) and mutual information effective SINR mapping (MIESM), are widely used because of their good accuracy. Basic idea behind these effective SINR metrics is to convert instantaneous SINR values of each OFDM subcarrier to one single scalar value and then map this single value to an error probability. For multiple input-multiple output (MIMO) channels, spatial conditions and the most suitable rank for transmission may be determined by computing a matrix condition number or different variations of it. The effective SINR mapping method is suitable for MIMO channels as well. The LQM may be employed to find an error rate by using a look-up table (LUT). The best or otherwise most appropriate modulation and coding scheme (MCS) and/or rank for a current channel state may be chosen based on the desired error rate.

In block 204, a channel quality indicator is determined based on the modulation, coding and rank scheme.

A suggestion for an MCRS may be conveyed to a transmitter in the form of a channel quality indicator (and rank indicator (RI)).

A channel quality indicator is designed to provide a node with information on link adaptation parameters a user device is able to support. The channel quality indicator is typically defined as a table comprising modulation and coding schemes.

A rank indicator is user device's suggestion or recommendation for the number of layers or streams to be used in spatial multiplexing for multiple input-multiple output (MIMO) systems. In the case a current system does not support MIMO, the rank indicator is typically not reported.

If a high order modulation is chosen (block 206), in block 208, a detector class indicator is added to the channel quality indicator for informing on capability to the high order modulation.

A high order modulation may be 64-quadrature amplitude modulation or another modulation method using at least a relatively high number of different symbols for data transmission. In this application, QPSK or 16-quadrature amplitude modulation are not taken as high order modulation methods. The term "high order modulation" is known in the art.

The detector class indicator may comprise one bit, "1" for "yes" and "0" for "no", for example.

A detector class indicator may be used by a transmitter in the following manner (64-QAM, 16-QAm and QPSK are taken herein as examples): if a detector does not support 64-QAM or another high order modulation, an MCRS lookup table may be modified to contain only fields with QPSK and 16-QAM or other lower order modulations. Another option is to use a small lookup table to substitute the selected MCRS using 64-QAM with a MCRS using a lower order modulation. This is designed to save computation resources in the adaptation process by having to go through a lower amount of table entries.

The embodiment ends in block 210. The embodiment is repeatable in many ways. One example is shown by arrow 212 in FIG. 2.

Another embodiment may be carried out by a device configured to operate as a network apparatus, such as a server, (e)node or host. The embodiment may also be provided as a cloud service. The embodiment is suitable for serving user devices that do not support high order modulation (such as 64-quadrature amplitude modulation (64-QAM)), but have a detector able to process higher code rates and number of transmission streams to reach a higher data rate.

The embodiment starts in block 300 of FIG. 3.

In block 302, a channel quality indicator comprising a detector class indicator informing transmitter's capability to high order modulation is obtained.

A channel quality indicator is designed to provide a node with information on link adaptation parameters a user device is able to support. The channel quality indicator is typically defined as a table comprising modulation and coding schemes.

In addition to a channel quality indicator, a rank indicator may be obtained. The rank indicator (RI) is user device's suggestion or recommendation for the number of layers or streams to be used in spatial multiplexing for multiple input-multiple output (MIMO) systems. In the case a current system does not support MIMO, the rank indicator is typically not reported.

A high order modulation may be 64-quadrature amplitude modulation or another modulation method using at least a relatively high number of different symbols for data transmission. In this application, QPSK or 16-quadrature amplitude modulation are not taken as high order modulation methods. The term "high order modulation" is known in the art.

The detector class indicator may comprise one bit, "1" for "yes" and "0" for "no", for example.

A detector class indicator may be used by a transmitter in the following manner (64-QAM, 16-QAM and QPSK are taken herein as examples): if a detector does not support 64-QAM, an MCRS lookup table may be modified to contain only fields with QPSK and 16-QAM. Another option is to use a small lookup table to substitute the selected MCRS using 64-QAM with an MCRS using a lower order modulation. This is designed to save computation resources in the adaptation process by having to go through a lower amount of table entries.

If the high order modulation is not supported by a receiver (block 304), in block 306, the modulation, coding and rank scheme utilizing the high order modulation is substituted with a modulation, coding and rank scheme utilizing a lower order modulation and providing nearest similar performance. This may be carried out by modifying a modulation, coding and rank scheme table to contain only fields with at least one lower order modulation, or determining a second table wherein the modulation, coding and rank scheme utilizing the high order modulation is replaced with a modulation, coding and rank scheme using the at least one lower order modulation.

In the used example, the 64-QAM offers better throughput than the 16-QAM or QPSK, but has higher complexity and requires more power and computation time in a receiver. When 16-QAM and/or QPSK modulations are combined with a suitable coding rate and/or transmission rank, the same, or at least significantly the same, throughput is achievable as by using 64-QAM. Thus, if a detector does not support 64-QAM or another high order modulation, a recommended MCRS may be substituted with an MCRS providing at least significantly similar performance but using a lower order modulation. Hence, complexity and power consumption of the receiver may be reduced without decreasing performance.

This may be implemented by modifying an MCRS lookup table to contain only fields with QPSK and 16-QAM or other lower order modulations. Another option is to use a small lookup table to substitute the selected MCRS using 64-QAM or another high order modulation with an MCRS using a lower order modulation. This is designed to save computation resources in the adaptation process by having to go through a lower amount of table entries.

Hence, in transmission adaptation, a small lookup table may be used to map an MCRS using 64-QAM or another high order modulation to another MCRS with similar performance but a lower modulation order. This approach is suitable for user devices or terminals that do not support 64-QAM or another higher order modulation, but have a detector capable to process higher code rates and number of transmission streams to reach a higher data rate.

The embodiment ends in block 304. The embodiment is repeatable in many ways. One example is shown by arrow 306 in FIG. 3.

The steps/points, signaling messages and related functions described above in FIGS. 2 and 3 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, broadcasting, signalling transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to terms transmission and reception as well.

An embodiment provides an apparatus which may be any user device or any other suitable apparatus capable to carry out processes described above in relation to FIG. 2.

It should be appreciated that an apparatus may include or otherwise be in communication with a control unit, one or more processors or other entities capable of carrying out operations according to the embodiments described by means of FIG. 2. It should be understood that each block of the flowchart of FIG. 2 and any combination thereof may be implemented by various means or their combinations, such as hardware, software, firmware, one or more processors and/or circuitry.

FIG. 4 illustrates a simplified block diagram of an apparatus according to an embodiment.

As an example of an apparatus according to an embodiment, it is shown apparatus 400, such as a node, including facilities in control unit 404 (including one or more processors, for example) to carry out functions of embodiments according to FIG. 4. The facilities may be software, hardware or combinations thereof as described in further detail below.

In FIG. 4, block 406 includes parts/units/modules needed for reception and transmission, usually called a radio front end, RF-parts, radio parts, radio head, etc.

Another example of apparatus 400 may include at least one processor 404 and at least one memory 402 including a computer program code, the at least one memory and the computer program code configured to, with the at least one processor, cause the apparatus at least to: choose a modulation, coding and rank scheme, determine a channel quality indicator based on the modulation, coding and rank scheme, and add a detector class indicator to the channel quality indicator for informing capability to the high order modulation, if a high order modulation is chosen.

Yet another example of an apparatus comprises means 404 (406) for choosing a modulation, coding and rank scheme, means 404 for determining a channel quality indicator based on the modulation, coding and rank scheme, and means 404 for adding a detector class indicator to the channel quality indicator for informing capability to the high order modulation, if a high order modulation is chosen.

Yet another example of an apparatus comprises a chooser configured to choose a modulation, coding and rank scheme, a determination unit configured to determine a channel quality indicator based on the modulation, coding and rank scheme, and an adding unit configured to add a detector class indicator to the channel quality indicator for informing capability to the high order modulation, if a high order modulation is chosen.

It should be understood that the apparatuses may include or be coupled to other units or modules etc., such as radio parts or radio heads, used in or for transmission and/or reception. This is depicted in FIG. 4 as optional block 406.

Although the apparatuses have been depicted as one entity in FIG. 4, different modules and memory may be implemented in one or more physical or logical entities.

An embodiment provides an apparatus which may be a node, host, server or other suitable apparatus capable to carry out processes described above in relation to FIG. 3.

It should be appreciated that an apparatus may include or otherwise be in communication with a control unit, one or more processors or other entities capable of carrying out operations according to the embodiments described by means of FIG. 3. It should be understood that each block of the flowchart of FIG. 3 and any combination thereof may be implemented by various means or their combinations, such as hardware, software, firmware, one or more processors and/or circuitry.

FIG. 5 illustrates a simplified block diagram of an apparatus according to an embodiment.

As an example of an apparatus according to an embodiment, it is shown apparatus 500, including facilities in control unit 504 (including one or more processors, for example) to carry out functions of embodiments according to FIG. 3. The facilities may be software, hardware or combinations thereof as described in further detail below.

In FIG. 5, block 506 includes parts/units/modules needed for reception and transmission, usually called a radio front end, RF-parts, radio parts, radio head, etc.

Another example of apparatus 500 may include at least one processor 504 and at least one memory 502 including a computer program code, the at least one memory and the computer program code configured to, with the at least one processor, cause the apparatus at least to: obtain a channel quality indicator comprising a detector class indicator informing transmitter's capability to a high order modulation, and substitute the modulation, coding and rank scheme utilizing the high order modulation with a modulation, coding and rank scheme utilizing a lower order modulation and providing nearest similar performance, if the high order modulation is not supported by a receiver.

Yet another example of an apparatus comprises means 504 (506) for obtaining a channel quality indicator comprising a detector class indicator informing transmitter's capability to a high order modulation, and means 504 for substituting the modulation, coding and rank scheme utilizing the high order modulation with a modulation, coding and rank scheme utilizing a lower order modulation and providing nearest similar performance, if the high order modulation is not supported by a receiver.

Yet another example of an apparatus comprises an obtainer configured to obtain a channel quality indicator comprising a detector class indicator informing transmitter's capability to a high order modulation, and a substitutor configured to substitute the modulation, coding and rank scheme utilizing the high order modulation with a modulation, coding and rank scheme utilizing a lower order modulation and providing nearest similar performance, if the high order modulation is not supported by a receiver.

It should be understood that the apparatuses may include or be coupled to other units or modules etc., such as radio parts or radio heads, used in or for transmission and/or reception. This is depicted in FIG. 5 as optional block 506.

Although the apparatuses have been depicted as one entity in FIG. 5, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

What is claimed is:

1. An apparatus comprising:
   at least one processor and at least one memory including a computer program code, the at least one memory and the computer program code configured to, with the at least one processor, cause the apparatus at least to:
   choose, by a user device in a wireless network, a modulation, coding and rank scheme;
   determine, by the user device, a channel quality indicator based on the modulation, coding and rank scheme,
   add a detector class indicator to the channel quality indicator for informing capability to a high order modulation, the detector class indicator informing whether the high order modulation is or is not chosen, wherein the high order modulation comprises 64-quadrature amplitude modulation, and wherein the high order modulation excludes quadrature phase shift keying (QPSK) and 16-quadrature amplitude modulation (16-QAM),
   transmit by the user device the channel quality indicator comprising the detector class indicator toward the wireless network, and
   communicate by the user device information using a modulation, coding and rank scheme based on the detector class indicator.

2. The apparatus of claim 1, wherein the choosing of the modulation, coding and rank scheme is based on determining a link quality metric.

3. The apparatus of claim 2, wherein the determination of a link quality metric is based on signal-to-interference-plus-noise ratio (SINR), mutual information, capacity and/or radio channel conditions.

4. The apparatus of claim 1, wherein the detector class indicator consists of one bit.

5. The apparatus of claim 1, the apparatus comprising the user device.

6. A method comprising:
choosing, by a user device in a wireless network, a modulation, coding and rank scheme;
determining, by the user device, a channel quality indicator based on the modulation, coding and rank scheme,
adding a detector class indicator to the channel quality indicator for informing capability to a high order modulation, the detector class indicator informing whether the high order modulation is or is not chosen, wherein the high order modulation comprises 64-quadrature amplitude modulation, and wherein the high order modulation excludes quadrature phase shift keying (QPSK) and 16-quadrature amplitude modulation (16-QAM),
transmitting by the user device the channel quality indicator comprising the detector class indicator toward the wireless network, and
communicating by the user device information using a modulation, coding and rank scheme based on the detector class indicator.

7. The method of claim 6, wherein the choosing of the modulation, coding and rank scheme is based on determining a link quality metric.

8. The method of claim 7, wherein if the detector class indicator informs that the high order modulation is supported, the communicating utilizes the modulation, coding and rank scheme of the high order modulation.

9. The method of claim 7, wherein the determination of a link quality metric is based on signal-to-interference-plus-noise ratio (SINR), mutual information, capacity and/or radio channel conditions.

10. The method of claim 6, wherein the detector class indicator consists of one bit.

11. The method of claim 6, wherein if the detector class indicator informs that the high order modulation is not supported, the communicating utilizes a modulation, coding and rank scheme that is a lower order modulation and providing nearest similar performance than a modulation, coding and rank scheme utilizing the high order modulation.

12. A computer readable memory tangibly storing a computer program comprising program code for controlling an apparatus to execute a process, the process comprising:
choosing, by a user device in a wireless network, a modulation, coding and rank scheme;
determining, by the user device, a channel quality indicator based on the modulation, coding and rank scheme,
adding a detector class indicator to the channel quality indicator for informing capability to a high order modulation, the detector class indicator informing whether the high order modulation is or is not chosen, wherein the high order modulation comprises 64-quadrature amplitude modulation, and wherein the high order modulation excludes quadrature phase shift keying (QPSK) and 16-quadrature amplitude modulation (16-QAM),
transmitting by the user device the channel quality indicator comprising the detector class indicator toward the wireless network, and
communicating by the user device information using a modulation, coding and rank scheme based on the detector class indicator.

13. The computer readable memory according to claim 12, wherein the detector class indicator consists of one bit.

* * * * *